United States Patent
Fietzek

(10) Patent No.: US 12,077,058 B1
(45) Date of Patent: Sep. 3, 2024

(54) SYSTEMS AND METHODS FOR MANAGING ELECTRIC VEHICLE CHARGING NETWORKS USING AN OPEN CHARGE POINT PROTOCOL PROXY

(71) Applicant: InCharge Energy, Inc., Santa Monica, CA (US)

(72) Inventor: Cliff Fietzek, Arlington, VA (US)

(73) Assignee: InCharge Energy, Inc., Santa Monica, CA (US)

( * ) Notice: Subject to any disclaimer, the term of this patent is extended or adjusted under 35 U.S.C. 154(b) by 0 days.

(21) Appl. No.: 18/310,767

(22) Filed: May 2, 2023

(51) Int. Cl.
| | |
|---|---|
| *H04L 12/00* | (2006.01) |
| *B60L 53/30* | (2019.01) |
| *B60L 53/68* | (2019.01) |
| *H04L 67/12* | (2022.01) |
| *H04L 67/56* | (2022.01) |

(52) U.S. Cl.
CPC ............ *B60L 53/305* (2019.02); *B60L 53/68* (2019.02); *H04L 67/12* (2013.01); *H04L 67/56* (2022.05)

(58) Field of Classification Search
CPC ........ B60L 53/305; B60L 53/68; B60L 50/50; B60L 53/12; B60L 53/65; B60L 53/64; B60L 53/665; H04L 67/12; H04L 67/56
USPC ........................................................ 709/223
See application file for complete search history.

(56) References Cited

U.S. PATENT DOCUMENTS

| | | | |
|---|---|---|---|
| 8,013,570 B2 * | 9/2011 | Baxter | .................... B60L 53/64 |
| | | | 320/108 |
| 8,324,859 B2 | 12/2012 | Rossi | |
| 8,531,162 B2 | 9/2013 | Hafner | |
| 8,686,687 B2 | 4/2014 | Rossi | |
| 11,171,509 B2 | 11/2021 | Lee | |
| 11,568,159 B2 | 1/2023 | Kovarik | |
| 2022/0379763 A1 * | 12/2022 | Kydd | ...................... B60L 53/64 |
| 2023/0264591 A1 * | 8/2023 | Silorio | .................... B60L 53/65 |
| | | | 320/109 |
| 2023/0286409 A1 * | 9/2023 | Feldman | ............... B60L 53/665 |

FOREIGN PATENT DOCUMENTS

| | | | | |
|---|---|---|---|---|
| WO | WO-2013115428 A1 * | 8/2013 | ............. | B60L 50/50 |
| WO | WO-2018172007 A1 * | 9/2018 | ............. | B60L 53/30 |
| WO | WO-2020069820 A1 * | 4/2020 | ............. | B60L 53/12 |

* cited by examiner

*Primary Examiner* — Frantz Coby
(74) *Attorney, Agent, or Firm* — Select IP Law Corporation; Ashkon Cyrus

(57) ABSTRACT

An electric vehicle charging system is provided. The system includes a charging point, one or more EV charging networks, and an open charge point protocol (OCPP) proxy computing device in communication with the charging point and the one or more EV charging networks. The OCPP proxy computing device includes at least one processor in communication with at least one memory device. The at least one processor is programmed to receive communication from the charging point, and relay the communication to the one or more EV charging networks.

17 Claims, 5 Drawing Sheets

US 12,077,058 B1

SYSTEMS AND METHODS FOR MANAGING ELECTRIC VEHICLE CHARGING NETWORKS USING AN OPEN CHARGE POINT PROTOCOL PROXY

BACKGROUND

The field of the disclosure relates generally to systems and methods of electric vehicle (EV) charging systems, and more particularly, to systems and methods of managing electric vehicle (EV) charging networks in EV charging systems.

EVs have become popular. The charging points are typically managed by a charging network. With the growing popularity of EVs, known system and methods are disadvantaged in some aspects in meeting the changing needs of EVs and improvements are desired.

BRIEF DESCRIPTION

In one aspect, an electric vehicle charging system is provided. The system includes a charging point, one or more EV charging networks, and an open charge point protocol (OCPP) proxy computing device in communication with the charging point and the one or more EV charging networks. The OCPP proxy computing device includes at least one processor in communication with at least one memory device. The at least one processor is programmed to receive communication from the charging point, and relay the communication to the one or more EV charging networks.

In another aspect, an OCPP proxy computing device of an EV charging system is provided. The EV charging system includes a charging point and one or more EV charging networks. The OCPP proxy computing device includes at least one processor in communication with at least one memory device. The at least one processor is programmed to receive communication from the charging point, and relay the communication to the one or more EV charging networks.

In one more aspect, a method of managing EV charging networks in an EV charging system is provided. The method includes providing an OCPP proxy computing device, and establishing communication between the OCPP proxy computing device and a charging point and communication between the OCPP proxy computing device and one or more EV charging networks. The method also includes receiving, by the OCPP proxy computing device, communication from the charging point, and relaying, by the OCPP proxy computing device, the communication to the one or more EV charging networks.

BRIEF DESCRIPTION OF DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes systems and methods for managing electric vehicle (EV) charging networks. An EV is a vehicle that operates on an electric motor, and may be a battery electric vehicle (BEV), a plug-in hybrid electric vehicle (PHEV), or a hybrid electric vehicle (HEV). Method aspects will be in part apparent and in part explicitly discussed in the following description.

Figure 1:
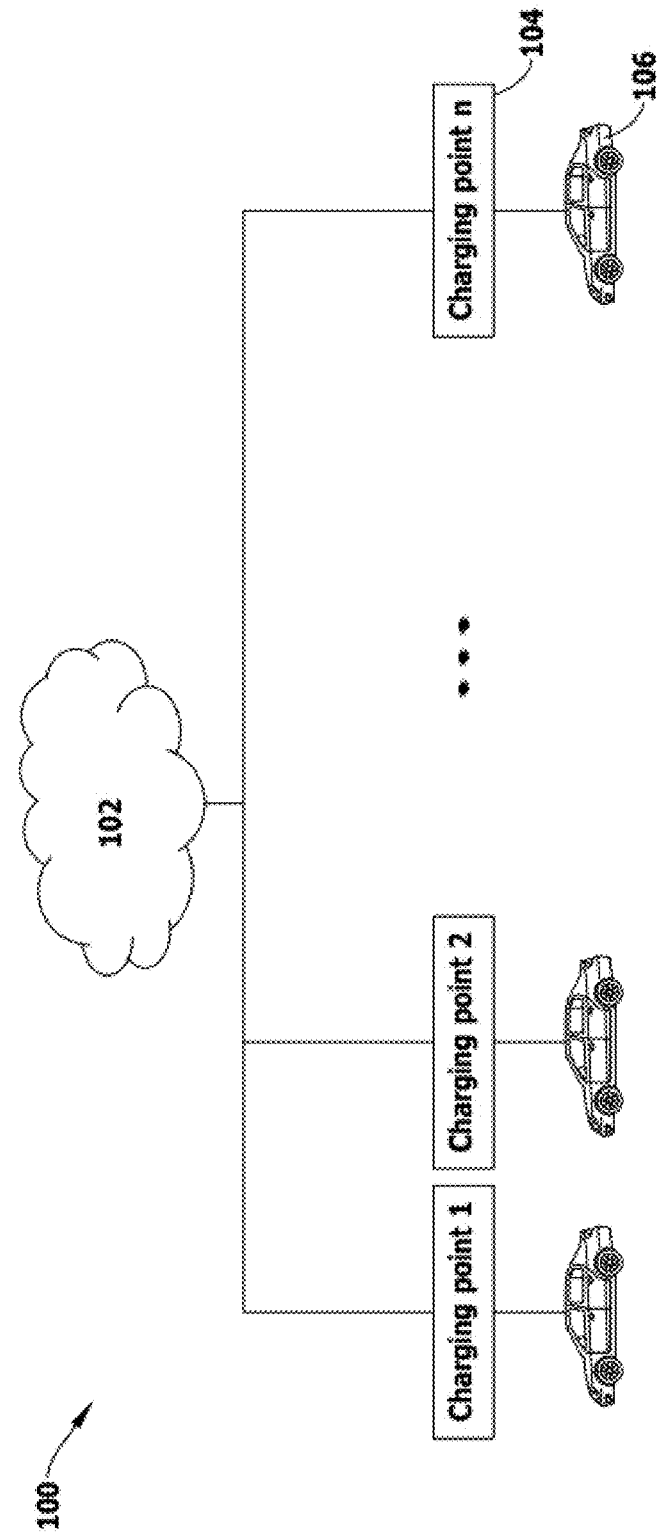
FIG. 1 is a schematic diagram of a known electric vehicle (EV) charging system.

FIG. 1 is a schematic diagram of a known EV charging system 100. EV charging system 100 includes an EV charging network 102 that is in the cloud. The cloud includes servers or server computing devices accessible over the Internet, and the software and databases that run on those servers. Known EV charging system 100 further includes charging points 104 in communication with EV charging network 102 via the Internet. Charging point 104 may be a point that an electric vehicle 106 is charged by receiving electric power from a power grid.

In known EV charging system 100, for a given charging point 104, the connection between EV charging network 102 and charging point 104 is one to one. When electric vehicle 106 requests being charged at charging point 104, the communication from charging point 104 is sent to EV charging network 102. EV charging network 102 facilitates payment and controls the charging session at charging point 104. EV charging network 102 may also perform services on charging point 104 such as maintenance and advertisement.

This one-to-one connection in known system 100 is inflexible. If EV charging network 102 malfunctions or ceases to operate, all charging points 104 connected to EV charging network 102 are compromised even become inoperable, the consequence of which may be severe because EV charging network 102 is often connected with many, like thousands of, charging points 104. Further, with the growing popularity of EVs, the demand for EV charging grows exponentially. Providing high-quality all-in-one services for all charging points 104 becomes impractical and inefficient for one single EV charging network 102. In addition, there is a growing need of removing, changing, and/or adding EV charging networks with little or no changes to the existing infrastructure such as charging points and/or EV charging networks. Known system 100 could not meet these needs.

The systems and methods described herein solve the above-described problems in known systems. An open charge point protocol (OCPP) proxy computing device is used to provide connections with multiple EV charging networks to one charging point.

A standard charging point includes only a one-to-one communication path with an EV charging network. Changes to the EV charging network require changes to all charging points. For example, to add or remove an EV charging network, or swap to a different EV charging network, changes need to be made to all charging points in the EV charging network, which are cumbersome and time consuming, because an EV charging network typically includes thousands of charging points.

In contrast, the systems and methods described herein provide flexibility to an EV charging system with little or no changes to the existing infrastructure. The systems and methods also simplifies adding, removing, swapping an EV charging network in an EV charging system. The systems and methods described herein are advantageous in keeping a customer's experience at a charging point the same. The systems and methods relieve the strain on the existing EV charging network by diverting secondary services to other EV charging networks. The systems and methods also ensure the stability of an EV charging station by providing a backup EV charging network.

Figure 2:
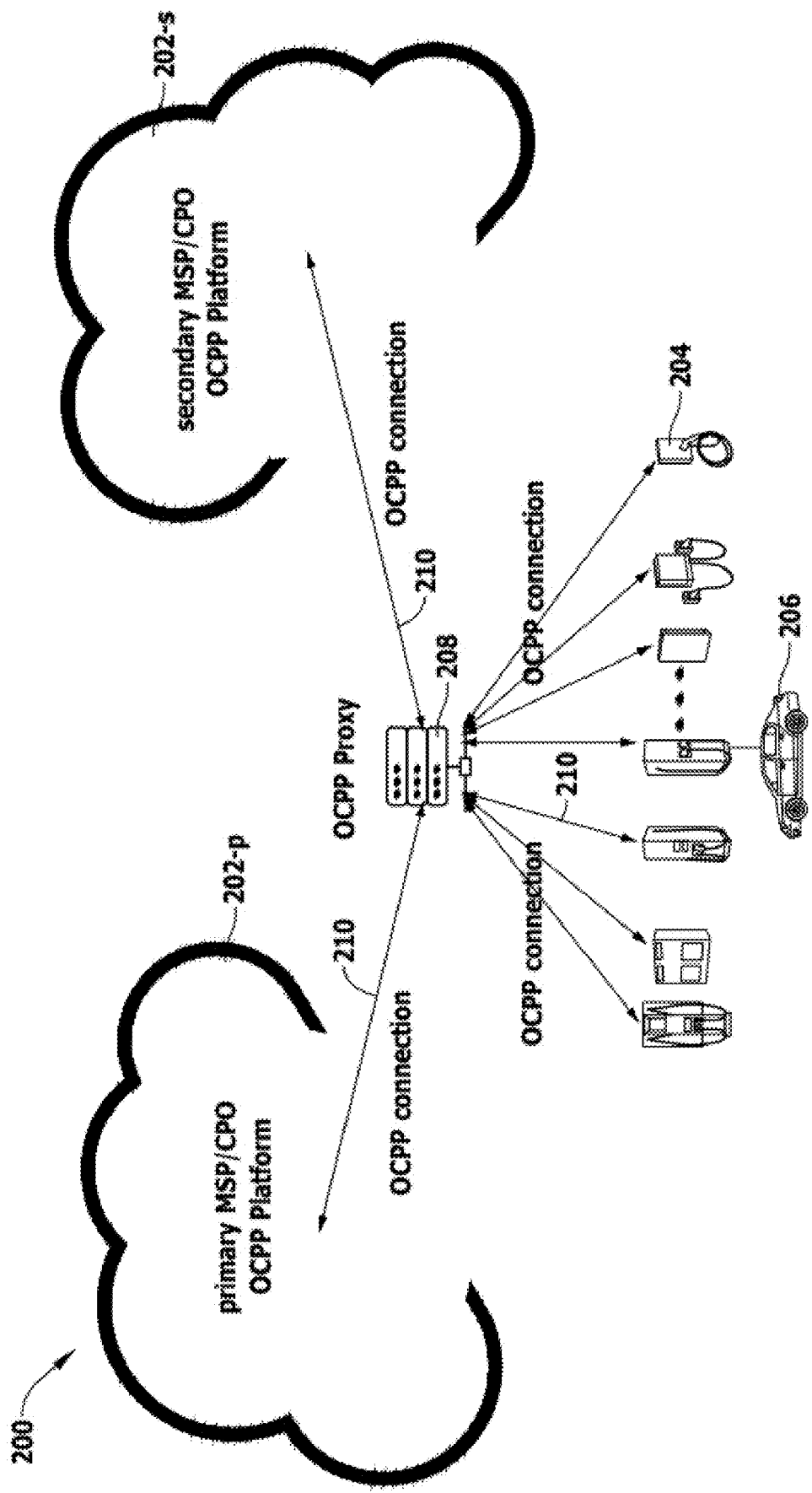
FIG. 2 is an example EV charging system.

FIG. 2 is a schematic diagram of an example EV charging system 200. In the example embodiment, EV charging system 200 includes a plurality of EV charging networks 202. EV charging network 202 may be a mobility service provider (MSP) OCPP platform, a charge point operator (CPO) OCPP platform, or a combination thereof. OCPP is an application protocol for communication between a charging point and a charging network. EV charging networks 202 are in the cloud. EV charging system 200 further includes charging point 104. Charging point 104 may be a point that an electric vehicle 106 is charged by receiving electric power from a power grid. Charging point 204 may be a charging station, or a charging outlet at home, office, or a facility such as a parking lot. A battery of electric vehicle 206 may be recharged at charging point 204. Charging point 204 typically includes one communication path to be connected with EV charging network 202.

In the example embodiment, EV charging system 200 further includes an OCPP proxy computing device 208. OCPP proxy computing device 208 is in communication with charging points 204 and EV charging networks 202. Communication in EV charging system 200 is two-way communication between two end points. Communication in EV charging system 200 is in OCPP. OCPP proxy computing device 208 is a server computing device such as being cloud based. Alternatively, OCPP proxy computing device is a user computing device in communication with charging points 204 and EV charging networks 202 through wired or wireless communication.

In operation, OCPP proxy computing device 208 is interjected between charging points and EV charging networks 202. OCPP proxy computing device xx facilitates a one-to-n mode of communication, where a single charging point 204 is in communication with multiple EV charging networks 202. Communication 210 from a charging point 204 is relayed to EV charging networks 202 via OCPP proxy computing device 208. Communication from EV charging network 202 is relayed to charging point 204 via OCPP proxy computing device 208.

In the example embodiment, EV charging networks 202 may include a primary EV charging network 202-*p* and a secondary EV charging network 202-*s*. Primary EV charging network 202-*p* is not in communication with secondary EV charging network 202-*s*. In some embodiments, primary EV charging network 202 and secondary EV charging network 202 are connected with one another by an interface and/or a communication channel. Primary EV charging network 202 performs the main function of controlling the charging session at charging point 204 such as checking the payment from the customer and controlling the charging session in recharging electric vehicle 206. Secondary EV charging network 202 performs secondary functions, such as providing services like maintenance, support, and advertisement. For example, secondary EV charging network 202 may perform diagnostics on charging point 204 and remotely repair charging point 204.

In the example embodiment, communication 210 from charging point 204 is relayed to primary EV charging network 202 via OCPP proxy computing device 208. OCPP proxy computing device 208 may make a copy of communication 210 and relay the copy to secondary EV charging network 202-*s*. Alternatively, OCPP proxy computing device 208 may filter communication 210 and relay filtered communication 210 to secondary EV charging network 202. For example, OCPP proxy computing device may relay communication 210 to primary EV charging network 202 as it is, therefore without any changes to existing infrastructure, and relay filtered communication 210 to secondary EV charging network 202. Filtered communication 210 may include only communication relevant to services provided by secondary EV charging networks 202-*s*. In some embodiments, OCPP proxy computing device 208 may filter communication 210 from charging point 204 into communication that is targeted for primary EV charging network 202 and/or for secondary EV charging network 202, and relay the corresponding filtered communication to primary EV charging network 202 and/or secondary EV charging network 202.

Systems and methods described herein are advantageous in providing communication that is independent from the OCPP version in which charging point 204 and/or EV charging networks 202 communicate. In known system 100, charging point 204 and EV charging network 202 must communicate in the same version of OCPP. In contrast, this requirement is obviated in the systems and methods described herein. OCPP proxy computing device 208 converts communication 210 from charging point 204 to the version of the communication in EV charging network 202, and vice versa, converts communication from EV charging network 202 to the version of the communication used in charging point 204.

In some embodiments, EV charging network 202-*p* is the primary charging network that performs all the function in a charging session while EV charging network 202-*s* is a back-up EV charging network. When EV charging network 202-*p* is malfunctioning and/or inoperable, OCPP proxy computing device 208 may disconnect from EV charging network 202-*p* and sending communication 210 to secondary EV charging network 202-*s* instead, without interruption to the charging services to charging points 204.

An EV charging system includes two EV charging networks are described herein as an example. EV charging system 200 may include more than two EV charging networks 202. EV charging networks may include one primary EV charging network 202 that performs the charging services and multiple secondary EV charging networks 202 that perform other services such as support, maintenance, and/or advertisement. Secondary EV charging networks 202 may perform different services. In some embodiments, OCPP proxy computing device 208 may provide filtered communication 210 to secondary EV charging networks 202 that includes communication specific to the functions performed by a secondary EV charging network 202. For example, if a secondary EV charging network 202 performs the function of maintenance, OCPP proxy computing device 208 provides communication 210 specific to maintenance such as diagnostics of charging point 204 and repair requests from charging point 204. Another secondary EV charging network 202 may perform the function of advertisement, and OCPP proxy computing device 208 may provide communication 210 specific to advertisement at charging point 204.

Figure 3:
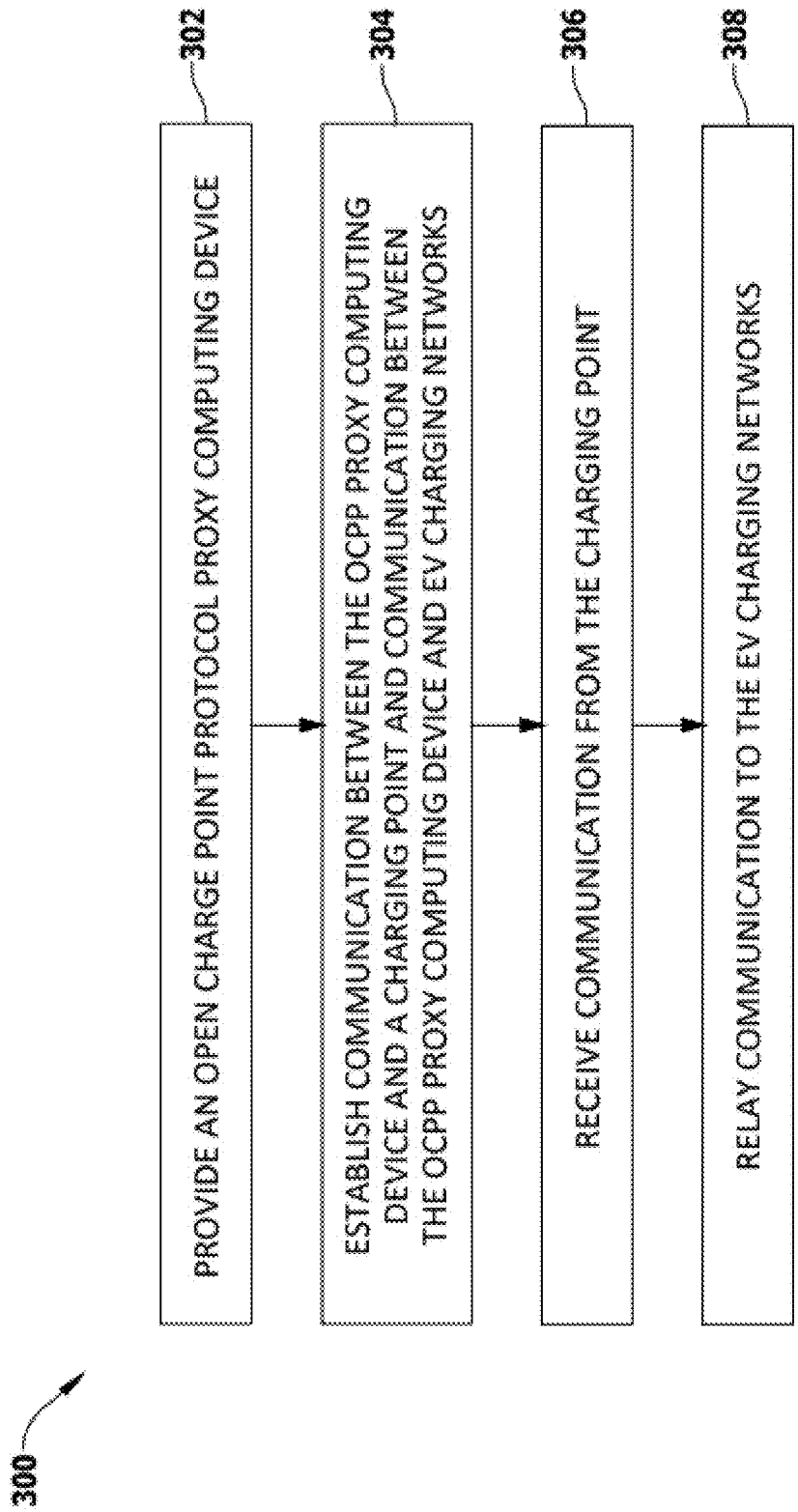
FIG. 3 shows a flow chart of an example method of managing EV charging networks in an EV charging system.

FIG. 3 is a flow chart of an example method 300 of managing EV charging networks in an EV system. Method 300 includes providing 302 an OCPP proxy computing device. An OCPP proxy computing device may any OCPP proxy computing device 208 as described above. Method 300 also include establishing 304 communication between the OCPP proxy computing device and a charging point and communication between the OCPP proxy computing device and EV charging networks. Further, method 300 includes receiving 306, by the OCPP proxy computing device, communication from the charging point. Method 300 also includes relaying 308, by the OCPP proxy computing device, the communication to the EV charging networks.

Systems and methods described herein are advantageous in providing flexibility with little or no changes to existing infrastructure. To charging point 204 and/or EV charging network 202, the customer experience remains the same. An additional EV charging network 202 may be included in EV charging system 200 by establishing a connection between OCPP proxy computing device 208 and additional EV charging network 202. An EV charging network 202 may be removed from EV charging system 200 by disconnecting OCPP proxy computing device 208 from EV charging network 202 that is to be removed, without the need of disconnecting EV charging network 202 that is to be removed from each charging point 204 in this EV charging network 202.

Systems and methods described herein are advantageous in meeting the quickly expanding need in EV charging systems, where the OCPP proxy computing device simplifies the addition, removal, or swapping of an EV charging network with little or no change to the existing infrastructure. Systems and methods relieve strain on existing EV charging networks by diverting communicating and functions to other EV charging networks.

Figure 4:
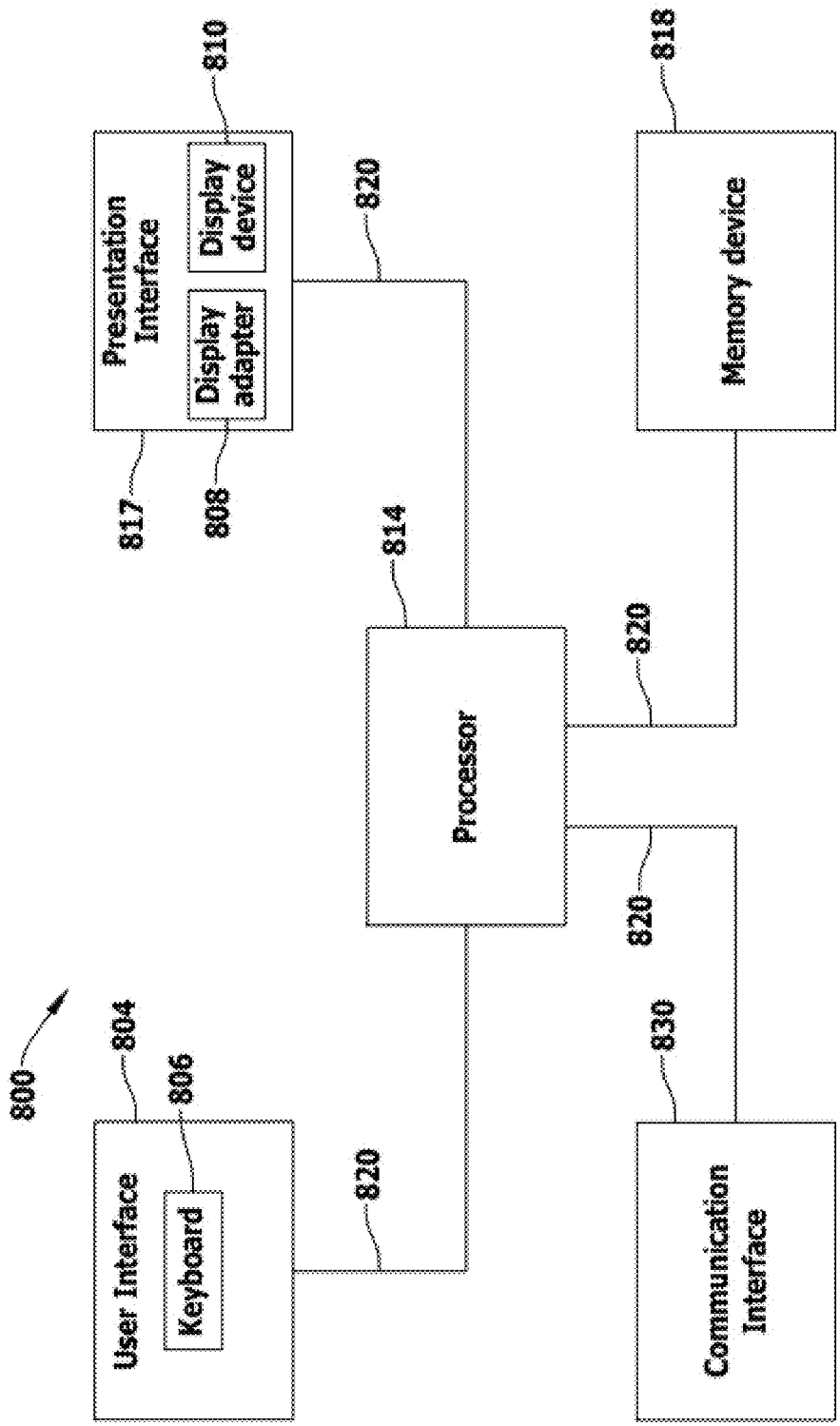
FIG. 4 is a block diagram of an example computing device.

EV charging network 102 described herein may be any suitable computing device 800 and software implemented therein. FIG. 4 is a block diagram of an example computing device 800. In the example embodiment, computing device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the example embodiment, computing device 800 includes a presentation interface 817 that presents information, such as input events and/or validation results, to the user. Presentation interface 817 may also include a display adapter 808 that is coupled to at least one display device 810. More specifically, in the example embodiment, display device 810 may be a visual display device, such as a cathode ray tube (CRT), a liquid crystal display (LCD), a light-emitting diode (LED) display, and/or an "electronic ink" display. Alternatively, presentation interface 817 may include an audio output device (e.g., an audio adapter and/or a speaker) and/or a printer.

Computing device 800 also includes a processor 814 and a memory device 818. Processor 814 is coupled to user interface 804, presentation interface 817, and memory device 818 via a system bus 820. In the example embodiment, processor 814 communicates with the user, such as by prompting the user via presentation interface 817 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor."

In the example embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the example embodiment, memory device 818 stores, without limitation, application source code, application object code, configuration data, additional input events, application states, assertion statements, validation results, and/or any other type of data. Computing device 800, in the example embodiment, may also include a communication interface 830 that is coupled to processor 814 via system bus 820. Moreover, communication interface 830 is communicatively coupled to data acquisition devices.

In the example embodiment, processor 814 may be programmed by encoding an operation using one or more executable instructions and providing the executable instructions in memory device 818. In the example embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 5:
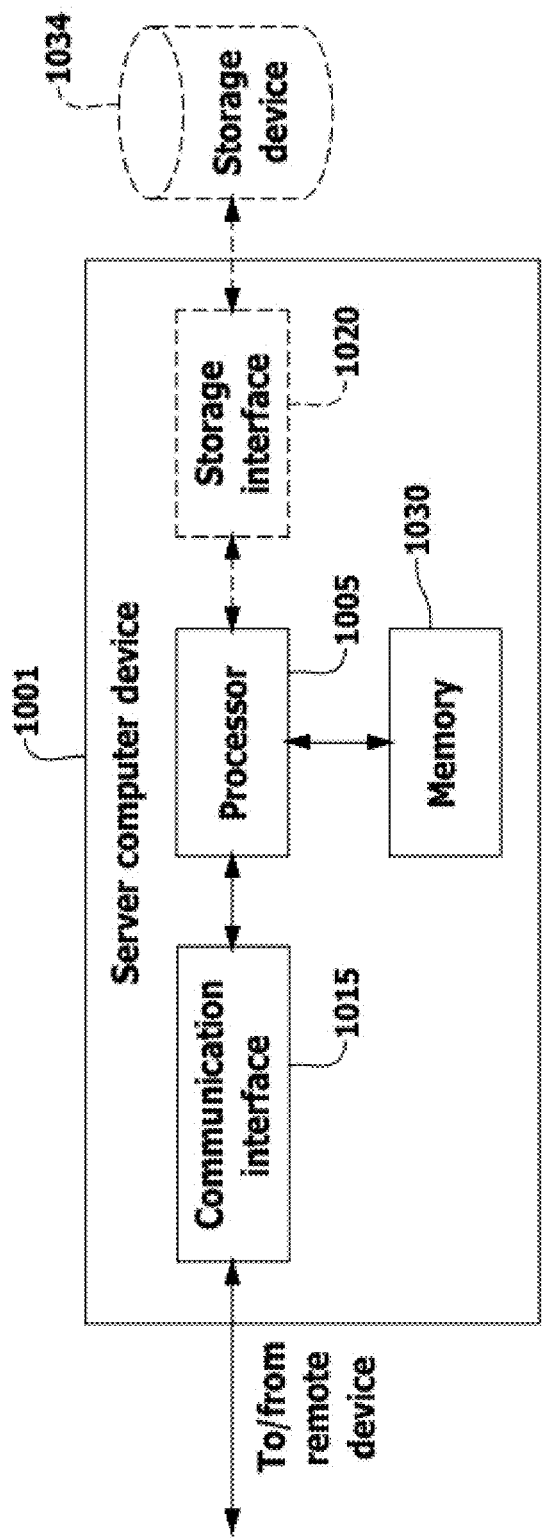
FIG. 5 is a block diagram of an example server computing device.

FIG. 5 illustrates an example configuration of a server computer device 1001 such as OCPP proxy computing device 208. Server computer device 1001 also includes a processor 1005 for executing instructions. Instructions may be stored in a memory area 1030, for example. Processor 1005 may include one or more processing units (e.g., in a multi-core configuration).

Processor 1005 is operatively coupled to a communication interface 1015 such that server computer device 1001 is capable of communicating with a remote device or another server computer device 1001. For example, communication interface 1015 may receive data from EV charging network 202, a charging point 204, or another OCPP proxy computing device 208 via the Internet.

Processor 1005 may also be operatively coupled to a storage device 1034. Storage device 1034 is any computer-operated hardware suitable for storing and/or retrieving data. In some embodiments, storage device 1034 is integrated in server computer device 1001. For example, server computer device 1001 may include one or more hard disk drives as storage device 1034. In other embodiments, storage device 1034 is external to server computer device 1001 and may be accessed by a plurality of server computer devices 1001. For example, storage device 1034 may include multiple storage units such as hard disks and/or solid state disks in a redundant array of independent disks (RAID) configuration, storage device 1034 may include a storage area network (SAN) and/or a network attached storage (NAS) system.

In some embodiments, processor 1005 is operatively coupled to storage device 1034 via a storage interface 1020.

Storage interface 1020 is any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

Systems and methods described herein allow multiple OCPP backend services to be provided to EV charging points by different providers. For example, services such as charging and maintenance are provided by one provider, while services such as billing, payment, and customer interaction are provided by a different provider.

At least one technical effect of the systems and methods described herein includes (a) providing flexibility in reconfiguring an EV charging system with little or no changes to the existing infrastructure; (b) simplifying the process of reconfiguring an EV charging system, and (c) providing communication between a charging point and an EV charging network in different versions of OCPPs.

Example embodiments of systems and methods of managing an EV charging system are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric vehicle charging system, comprising:
   a charging point;
   one or more EV charging networks; and
   an open charge point protocol (OCPP) proxy computing device in communication with the charging point and the one or more EV charging networks, the OCPP proxy computing device comprising at least one processor in communication with at least one memory device, and the at least one processor programmed to:
   receive communication from the charging point; and
   relay the communication to the one or more EV charging networks, wherein the communication from the charging point is in a first version of the OCPP, one of the one or more EV charging networks communicates in a second version of OCPP, and the at least one processor of the OCPP proxy computing devices is further programmed to;
   convert the communication from the charging point to the second version.

2. The system of claim 1, wherein the at least one processor of the OCPP proxy computing device is further programmed to:
   convert communication from the one of the one or more EV charging networks to the first version.

3. The system of claim 1, wherein the at least one processor of the OCPP proxy computing device is further programmed to:
   remove one of the one or more EV charging networks from the EV charging system by:
   disconnecting the OCPP proxy computing device from the one of the one or more EV charging networks.

4. The system of claim 1, wherein the at least one processor of the OCPP proxy computing device is further programmed to:
   including an additional EV charging network to the EV charging system by:
   connecting the OCPP proxy computing device with the additional EV charging network.

5. The system of claim 1, wherein the at least one processor of the OCPP proxy computing device is further programmed to:
   relay the communication by:
   filtering the communication; and
   relaying the filtered communication to at least one of the one or more EV charging networks.

6. The system of claim 1, wherein the at least one processor of the OCPP proxy computing device is further programmed to:
   relay the communication by:
   copying the communication to one of the one or more EV charging networks.

7. An open charge point protocol (OCPP) proxy computing device of an electric vehicle (EV) charging system, the EV charging system comprising a charging point and one or more EV charging networks, the OCPP proxy computing device comprising at least one processor in communication with at least one memory device, and the at least one processor programmed to:
   receive communication from the charging point; and
   relay the communication to the one or more EV charging networks wherein the communication from the charging point is in a first version of OCPP, one of the one or more EV charging networks communicates in a second version of OCPP, and the at least one processor is further programmed to: convert the communication from the charging point to the second version.

8. The OCPP proxy computing device of claim 7, wherein the at least one processor is further programmed to:
   convert communication from the one of the one or more EV charging networks to the first version.

9. The OCPP proxy computing device of claim 7, wherein the at least one processor is further programmed to:
   remove one of the one or more EV charging networks from the EV charging system by:
   disconnecting the OCPP proxy computing device from the one of the one or more EV charging networks.

10. The OCPP proxy computing device of claim 7, wherein the at least one processor of the OCPP proxy is further programmed to:
    including an additional EV charging network to the EV charging system by:

connecting the OCPP proxy computing device with the additional EV charging network.

11. The OCPP proxy computing device of claim 7, wherein the at least one processor is further programmed to:
relay the communication by:
filtering the communication; and
relaying the filtered communication to at least one of the one or more EV charging networks.

12. The OCPP proxy computing device of claim 7, wherein the at least one processor is further programmed to:
relay the communication by:
copying the communication to one of the one or more EV charging networks.

13. A method of managing electric vehicle (EV) charging networks in an EV charging system, the method comprising:
providing an open charge point protocol (OCPP) proxy computing device;
establishing communication between the OCPP proxy computing device and a charging point and communication between the OCPP proxy computing device and one or more EV charging networks;
receiving, by the OCPP proxy computing device, communication from the charging point; and
relaying, by the OCPP proxy computing device, the communication to the one or more EV charging networks, wherein the communication from the charging point is in a first version of OCPP, one of the one or more EV charging n works communicates in a second version of OCPP, and relaying the communication further comprises;
converting the communication from the charging point to the second version.

14. The method of claim 13, wherein relaying the communication further comprises:
converting communication from the one of the one or more EV charging networks to the first version.

15. The method of claim 13, wherein the method further comprises:
removing one of the one or more EV charging networks from the EV charging system by:
disconnecting the OCPP proxy computing device from the one of the one or more charging networks.

16. The method of claim 13, wherein the method further comprises:
including an additional EV charging network to the EV charging system by:
connecting the OCPP proxy computing device with the additional EV charging network.

17. The method of claim 13, wherein relaying the communication further comprises:
filtering the communication; and
relaying the filtered communication to at least one of the one or more EV charging networks.

* * * * *